United States Patent [15] 3,674,940

Leyburn et al. [45] July 4, 1972

[54] TELEPHONE TRANSLATOR APPARATUS

[72] Inventors: Derek Leyburn, Mississauga, Ontario; Bernard R. Montague, Dollard Des Ormeaux, Quebec; Henry K. Mattila, Roxboro, Quebec, all of Canada

[73] Assignee: Bell Canada, Montreal, Quebec, Canada

[22] Filed: June 29, 1970

[21] Appl. No.: 50,808

[30] Foreign Application Priority Data

July 3, 1969 Great Britain ....................33,657/69

[52] U.S. Cl. ....................179/18 ET
[51] Int. Cl. ....................H04q 3/47
[58] Field of Search ....................179/18 ET

[56] References Cited

UNITED STATES PATENTS

| | | | |
|---|---|---|---|
| 2,761,903 | 9/1956 | Den Hertog | 179/18 ET |
| 2,851,534 | 9/1958 | Bray et al. | 179/18 ET |
| 3,229,275 | 1/1966 | Warman et al. | 179/18 ET X |
| 3,011,029 | 11/1961 | Henning et al. | 179/18 ET |

*Primary Examiner*—William C. Cooper
*Attorney*—Philip T. Erickson

[57] ABSTRACT

Telephone translator apparatus including an integrated circuit translator unit for translating input codes each made up of a number of code digits into translations each made up of a number of information bits and a plurality of decoder stages to initiate a direct route connection and capable of providing an alternate route when a direct route is not available, the integrated circuit translator unit being selectively connected, in turn, to the output of each decoder stage.

10 Claims, 8 Drawing Figures

Inventors
Derek Leyburn
Bernard R. Montague
Henry K. Mattila
By Johnson, Marcus & Wray
Agents Inventors
Derek Leyburn
Bernard R. Montague
Henry K. Mattila
By
Johnson, Marcus & Wray
Agents Inventors
Derek Leyburn
Bernard R. Montague
Henry K. Mattila
By
Johnson, Marcus & Wray
Agents Inventors
Derek Leyburn
Bernard R. Montague
Henry K. Mattila
By Johnson, Marcus & Wray
Agents Inventors
Derek Leyburn
Bernard R. Montague
Henry K. Mattila
By. Johnson, Marcus & Gray
Agents

*Inventors*
Derek Leyburn
Bernard R. Montague
Henry K. Mattila
By Johnson, Marcus & Wray
Agents Inventors
Derek Leyburn
Bernard R. Montague
Henry K. Mattila
By
Johnson, Marcus & Wray
Agents Inventors
Derek Leyburn
Bernard R. Montague
Henry K. Mattila
By
Johnson, Marcus & Wray
Agents

TELEPHONE TRANSLATOR APPARATUS

This invention relates to telephone systems employing automatic switching equipment for the establishment of communication paths.

The invention is more particularly concerned with electrical code translators such as are employed in communication switching systems and automatic telephone systems.

The input signals to communication switching systems represent either data to be processed by the system or coded instructions which specify procedures to be followed. Translators are employed in such systems to convert switching information from one code form to a more convenient code form and to examine and classify this information to provide instructions to the switching systems.

In large multi-office telephone switching systems, the first three digits of subscriber directory numbers are office code digits identifying the local office to which the subscriber line terminates. When a call is initiated, the directory number is dialed and the digits are stored in common central office equipment, known as registers, which is responsive to the pulses incoming from the calling party. After registration is accomplished, the information is passed to one or more translators to select an outgoing trunk and to effect the extension of the call to a called subscriber line. The registered office code information may be indicated to the translator equipment by input conductors according to any one of a plurality of different known codes, such as a decimal code or a binary code or combinations of these and the output information from the translator may be indicated by information on the output conductors according to the same or a different code.

The first three, or office code digits, which are designated A, B, and C, respectively, are processed in a yes-no translator to determine whether the called subscriber station is within range of the local circuits of the switching exchange or if a sender is required to complete the call to stations outside the range of its local circuits. These digits, which have been stored in the A, B, and C registers are read out in parallel to provide input pulses to a translating network which is arranged to give a yes or no answer to the switching system. If a yes answer is obtained a sender is seized and the yes-no translator equipment is dismissed; however, if a no answer is obtained the local circuits are energized to complete the call and again the translator equipment is dismissed.

One type of telephone system is the number 4A crossbar switching system which forms a part of a nation-wide toll dialing plan for operator and customer dialing toll or calls. However, the long distance operator or the customer may dial or key the information for routing a call and the switching equipment then automatically completes the call. In some crossbar offices within a toll switching system, translators have been provided in the form of card translators where information for routing calls is contained on metal cards which are stored in the card translator. This is an electromagnetic device using metal cards, electron tubes, photo transistors and transistor amplifiers. A 4A system may well have three or more of these card translators. Each card translator normally stores the metal cards in twelve storage bins and each bin may contain a maximum of 100 cards, of which 98 are coded. A blank card is placed at each end of the deck and therefore the capacity of each translator is 1,176 coded cards and 24 blank cards.

Each card contains the routing information which is used for switching a specific call from a 4A system to another toll switching system or to the local office where it terminates. Each card is mechanically coded to respond to an authorized code, typically an area code, a national office code, or an area code plus a national office code. This coding is done by using different combinations of small metal tabs on the bottom of the metal cards. These tabs are used to select, or "drop" a card into the position where its routing information can be read. When a given 4A system receives a call, it determines (from the area code or from a combination of the area code and national office code) the corresponding card which has the routing information for that call. It then selects and drops this card.

The card blanks from which the working cards are made have 118 holes and the routing information for a working card is added to the blanks by enlarging some of these holes. That is, the routing information for switching a specific call is incorporated on a given card by enlarging certain of the holes in a definite pattern. This pattern is deciphered in the following manner.

When the converted cards are in the rack, awaiting a call, the 118 holes are all lined up to form tunnels through the cards. A light source on one side of the stack of cards shines through these tunnels, activating a group of photo-transistors lined up one in front of each tunnel on the other side. Nothing happens, however, since the associated transistor amplifiers are inactive. However, when a call comes in, the proper card is made to drop about three-sixteenths of an inch. This closes all of the light tunnels except the ones corresponding to the enlarged holes in the dropped card. At the same time, the transistor amplifiers are activated and those opposite the open light tunnels are energized. The resulting amplified signals are used to provide information required by other common control equipment, to switch the call. Changes in routing information are made by simply replacing cards and new routings are added by inserting new cards.

The 4A system is a crossbar system and therefore its basic element is a crossbar switch. The crossbar switch is an electrically operated relay mechanism consisting of ten horizontal parts and 10 or 20 vertical parts. Any horizontal part can be connected to any vertical part by operation of magnets. The points of connection are known as cross points and the switch with ten vertical parts has 100 cross points and is called a 100-point switch; the one with 20 vertical parts has 200 cross points and is called a 200-point switch.

In the above-mentioned 4A crossbar system it has been found that, in certain instances, greater speed is required than can be provided by the said card translators and associated relays. In order to provide the greater speed, systems have been designed using semiconductor devices and techniques throughout the translator. However, it has been the practice in some systems to provide a plurality of translations associated with a group of decoders, each translator being allocated to a set of decoders with said group and to utilize preference gates to exclude other decoders from a particular translator when a particular one decoder is using that particular translator.

It is an object of the present invention to provide an improved translator apparatus which can be constructed so as to be more economical in components and which may be an economical replacement of the abovementioned card type translator.

Accordingly, the present invention provides telephone translator apparatus comprising: a plurality of decoder stages; a translator to the output of each of said decoder stages; and means for connecting the output of each decoder stage in turn to the input of said translator unit.

More particularly, the present invention provides telephone translator apparatus comprising: a plurality of decoder stages each capable of being responsive to routing information to initiate completion of a route connection between a caller and a called party when a route therebetween is available; a translator unit for translating input codes each made up of a number of information bits representing said routing information and selectively connectable to the output of each of said decoder stages; and means for connecting the outputs of said decoder stages in turn to the input of said translator unit.

An embodiment of the present invention will now be described, by way of example, with reference to the accompanying drawings in which.

The embodiment of the present invention to be described utilizes a single translator unit, constructed by microcircuit techniques, which can be switched by a switching means whereby its input is connected in turn to the output of a selected one of a plurality of decoder stages. The switching of the translator to the different decoder stages may be controlled by a clock pulse means which provides successive clock timing pulses, each clock pulse being associated with a particular decoder stage. As each respective clock pulse from the clock pulse stage enables the output of the corresponding decoder stage, then the output of that decoder stage is connected to the input of the single translator.

Figure 1:
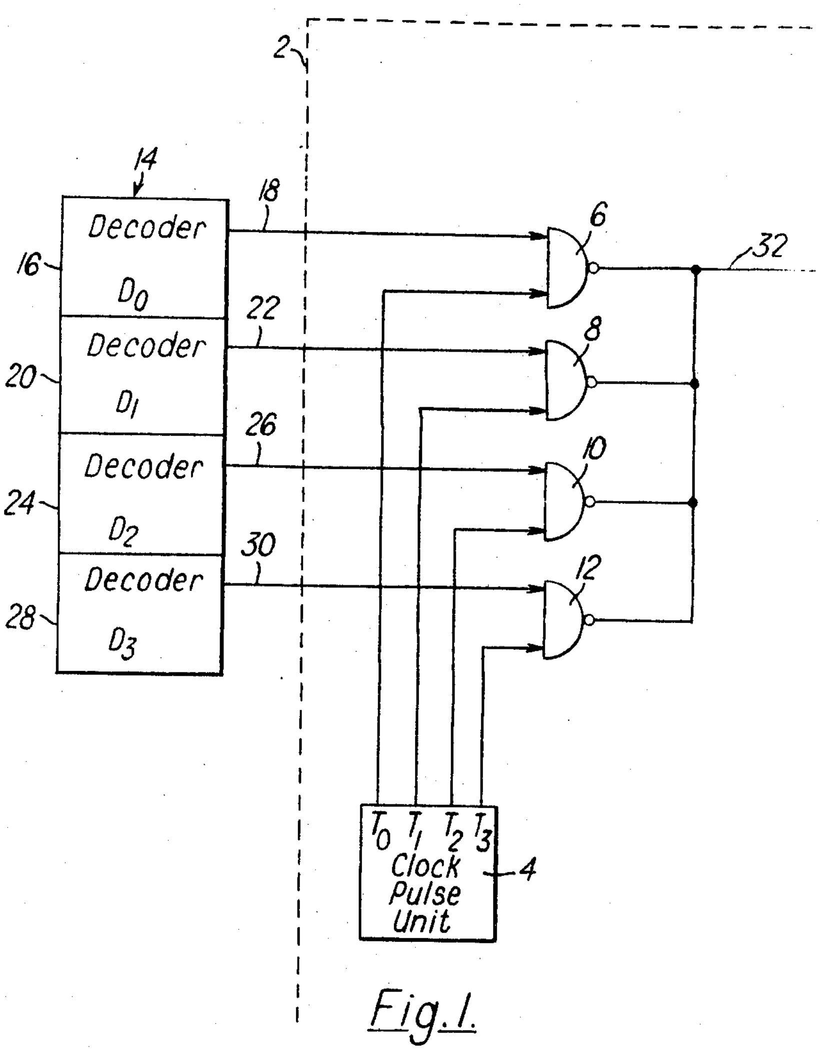
FIG. 1 is a simplified diagrammatic representation of part of the translator apparatus according to the present invention.

Referring to FIG. 1, a translator unit 2 includes a clock pulse generator 4 and a plurality of AND gates 6, 8, 10 and 12. The said AND gates are two-input gates each with one input connected to a respective output of a separate decoder stage within the decoder unit 14. Decoder stage 16 has an output connection 18 which is connected to one input of the AND gate 6, decoder stage 20 has an output connection 22 which is connected to one input of the AND gate 8, decoder stage 24 has an output connection 26 which is connected to one input of the AND gate 10, and decoder stage 28 has an output connection 30 which is connected to one input of the AND gate 12. The output connections from each of the AND gates 6, 8, 10 and 12 are connected in parallel to a common output line 32 which is connected to the next stage within the translator unit 2.

The second input to each of the AND gates 6, 8, 10 and 12 is provided with clock pulses from the clock pulse generator 4 at respective times $T_0$, $T_1$, $T_2$ and $T_3$ respectively. Thus, if a particular decoder stage 16, 20, 24 or 28 is activated so as to be requesting routing information from the translator unit 2 then its corresponding output connection 18, 22, 26 or 30 is enabled. However, the second input to the respective AND gate 6, 8, 10 or 12 is not enabled until the respective clock pulse appears at the clock pulse time corresponding to the particular decoder. For example, if decoder 24 (D2) is requesting routing information from the translator unit 2, then its output connection 26 is activated, i.e. enabled, but it is only at the clock pulse time $T_2$ that the corresponding second input of the AND gate 10 is enabled. Thus at time $T_2$ an output is passed through the AND gate 10 along the common output connection 32.

Figure 2:
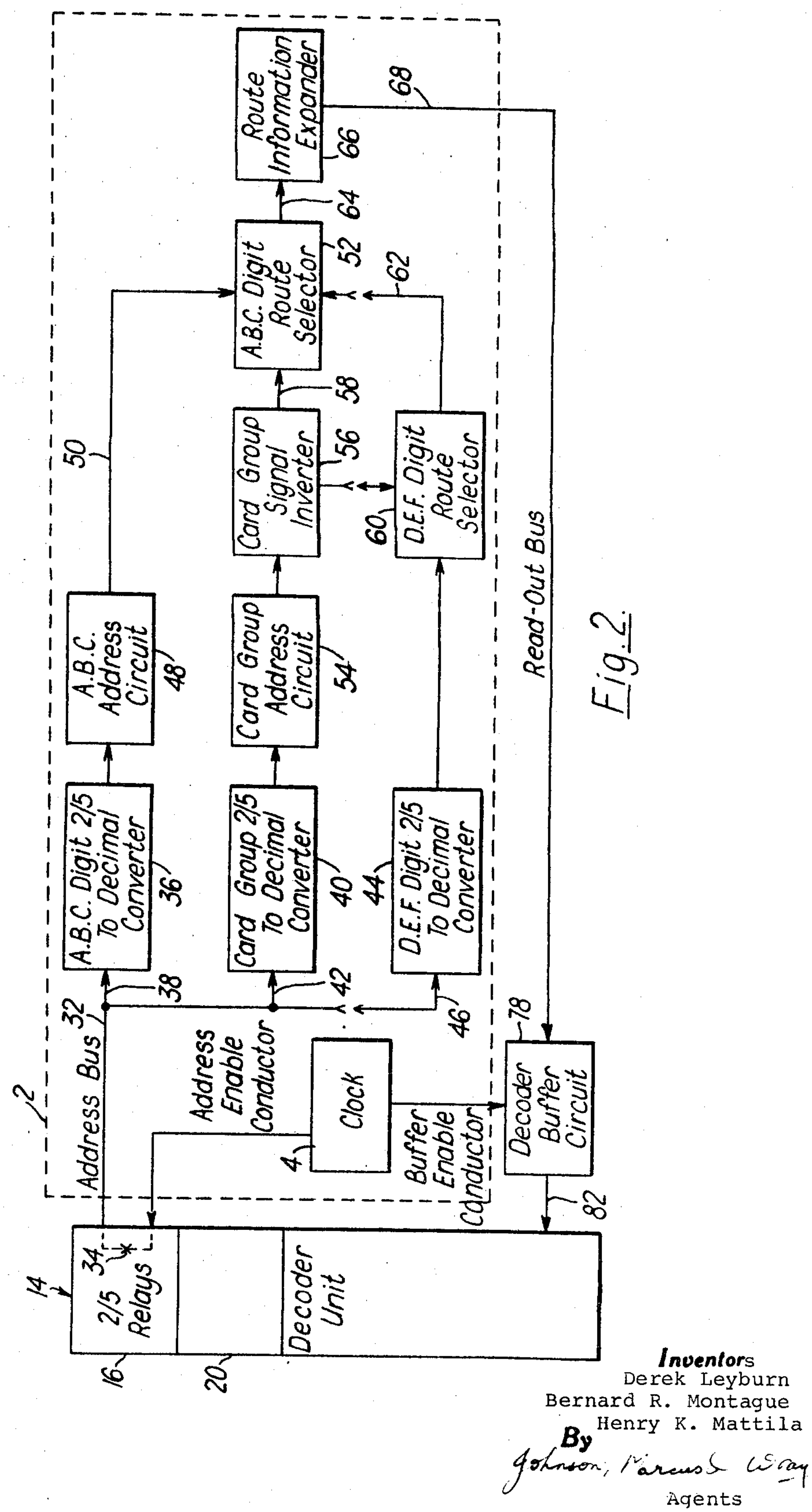
FIG. 2 is a more complete diagrammatic representation of apparatus according to the present invention.

In FIG. 2 there is illustrated a more detailed diagrammatic representation of the illustrated telephone translator apparatus according to the present invention. The same reference numerals are applied to corresponding parts as were used in FIG. 1 and, in fact, this referencing procedure is adopted throughout this specification.

The clock pulse unit 4 can be seen in FIG. 2 but the respective AND gates 6, 8, 10 and 12 of FIG. 1 are not specifically illustrated in FIG. 2. Instead, the clock pulse generator 4 is shown as directly controlling the two-out-of-five relays, e.g. 34, in the decoder stage 16.

The two-out-of-five output from the decoder stages, on the common line 32, is fed to an ABC digit two-out-of-five to decimal converter unit 36 on connection 38, to a card group two-out-of-five to decimal converter unit 40 on connection 42, and also to a DEF digit two-out-of-five to decimal converter unit 44 on connection 46, as shown in FIG. 2. The converter unit 36 feeds an ABC address circuit unit 48, the output therefrom being a decimal output on line 50 which is fed to an ABC digit route selector stage 52 having three inputs.

The output from the converter stage 40 is fed to a card group address circuit 54 which itself feeds a card group signal inverter unit 56 which provides an output along connection 58 to the ABC digit route selector unit 52, whilst the output of the converter unit 44 is supplied to a DEF digit route selector stage 60 which provides a third input on connection 62 to the ABC digit route selector unit 52. A cross-connection, as shown, is provided between the inverter unit 56 and the selector unit 60.

The output from the ABC address circuit 48, on connection 50, is the main part of the address and on being fed to the route selector 52 it is influenced, so far as the address is concerned, by the output from the card group signal inverter unit 56 and the output from the DEF digit route selector unit 60. The output from the route selector unit 52 is fed along a connection 64 to the input of a route information expander unit 66. The number of leads actually coming out of the route selector unit 52 is determined by the number of trunk groups which are provided, one lead being associated with each trunk group and thus the information from the route selector unit 52 is fed along only one lead in each case. Thus, the output from the route selector unit 52 is along a selected lead which is determined by the ABCDEF code which is fed as an input to the ABC address circuit unit 48 and the DEF digit decimal converter unit 44. As mentioned, the output from the route selector unit 52 appears on one selected trunk group line and the route information expander unit 66 receives this input and provides an output on selected ones of its 120 leads 68. The number of leads 68 which is enabled is determined by the corresponding information and may be in the code 2-out-of-5, 1-out-of-5, etc., each trunk group being allocated to a separate group of five leads.

The clock pulse circuit enables the integrated circuit translator unit to be shared by all the decoder stages in the office. A 5 microsecond time slot is required for each decoder stage present and a convenient number of decoder stages for each translator could well be up to a maximum of 20 decoder stages. Therefore, the maximum decoder holding time for translation purposes is 100 microseconds. In operation, an enable pulse is transmitted on the address and buffer enable leads during the alloted time interval for each decoder stage. If a decoder stage requires a translation at this time (2/5 code relays operated) a ground pulse is applied on the address bus leads and the respective buffer stage is conditioned to accept the read-out information.

Figure 3:
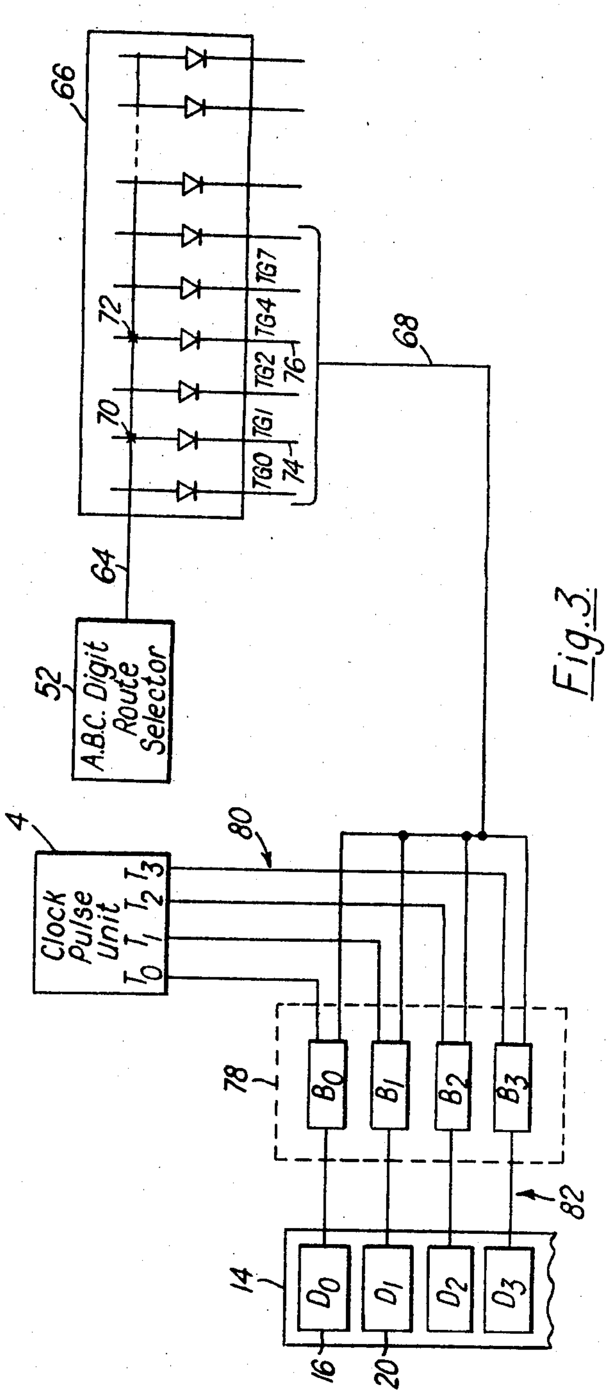
FIG. 3 is a diagrammatic representation of part of FIG. 2 showing the cross-connection field for the information expander unit.

In FIG. 3 there is diagrammatically illustrated one way in which the route information expander unit 66 will function to select the corresponding ones of its 120 read-out leads in accordance with the input on the selected one of the input leads 64. A typical cross-connection field is shown whereby, for example, the lead 64 is cross-connected at points 70 and 72 whereby an output is obtained through the respective diodes on leads 74 and 76. Thus, a typical two-out-of-five selection is made from the one lead input 64 to the selected output leads 68 of unit 66. As shown in FIGS. 2 and 3 the leads 68 are connected to the input of a decoder buffer unit 78 which, as shown in FIG. 2, receives timing pulses from the clock pulse unit 40 along connection 80 on a buffer enable conductor, and provides an output along connection 82 to the respective decoder stage. The decoder buffer unit 78 actually comprises a plurality of buffer stages, one buffer stage being allocated to each of the decoder stages and activated by the respective clock pulse $T_0$, $T_1$, $T_2$, or $T_3$, for example, which is allocated to the respective decoder stage. Thus, the decoder stage is connected to the translator unit 2 (FIG. 2), an output is obtained therefrom and fed through the respective buffer stage 78 back to the decoder within the time allocated to that decoder stage by its corresponding clock pulse at the allocated clock pulse period of time. In the illustrated embodiment this is achieved by the use of microcircuits within the translator unit 2, operating at a relatively high speed, as opposed to the relay-type circuits which have previously been used in some translator systems.

As mentioned above, each decoder is provided with a separate decoder buffer stage of unit 78 and the output on the selected ones of the 120 lines 68 is connected in parallel to each of the buffer stages within the buffer circuit unit 78, as shown in FIG. 3 where the respective buffer stages are indicated as connected to their corresponding decoder stage 16, 20, . . . which decoder stages are separately identified in FIG. 3 for clarity purposes. It will be appreciated that only that buffer stage D0, D1, D2, or D3 is enabled at the respective time $T_0$, $T_1$, $T_2$ or $T_3$, and thus only that buffer stage which is enabled provides an output back to the respective decoder stage within the decoder unit 14 whereby the decoder stage obtains the routing information which it requested from the translator together with the alternate route information.

The decoder buffer unit may consist of 100 silicon controlled rectifiers or, alternatively, 100 flip-flops. The rectifiers are "turned on" (or the flip-flops "set") by a combination of a 5 microsecond clock pulse and the presence of positive potential on the associated read-out lead. The selected rectifiers (or flip-flops) remain in an operated state until "turned off" (or "re-set") by the decoder unit.

Figure 4:
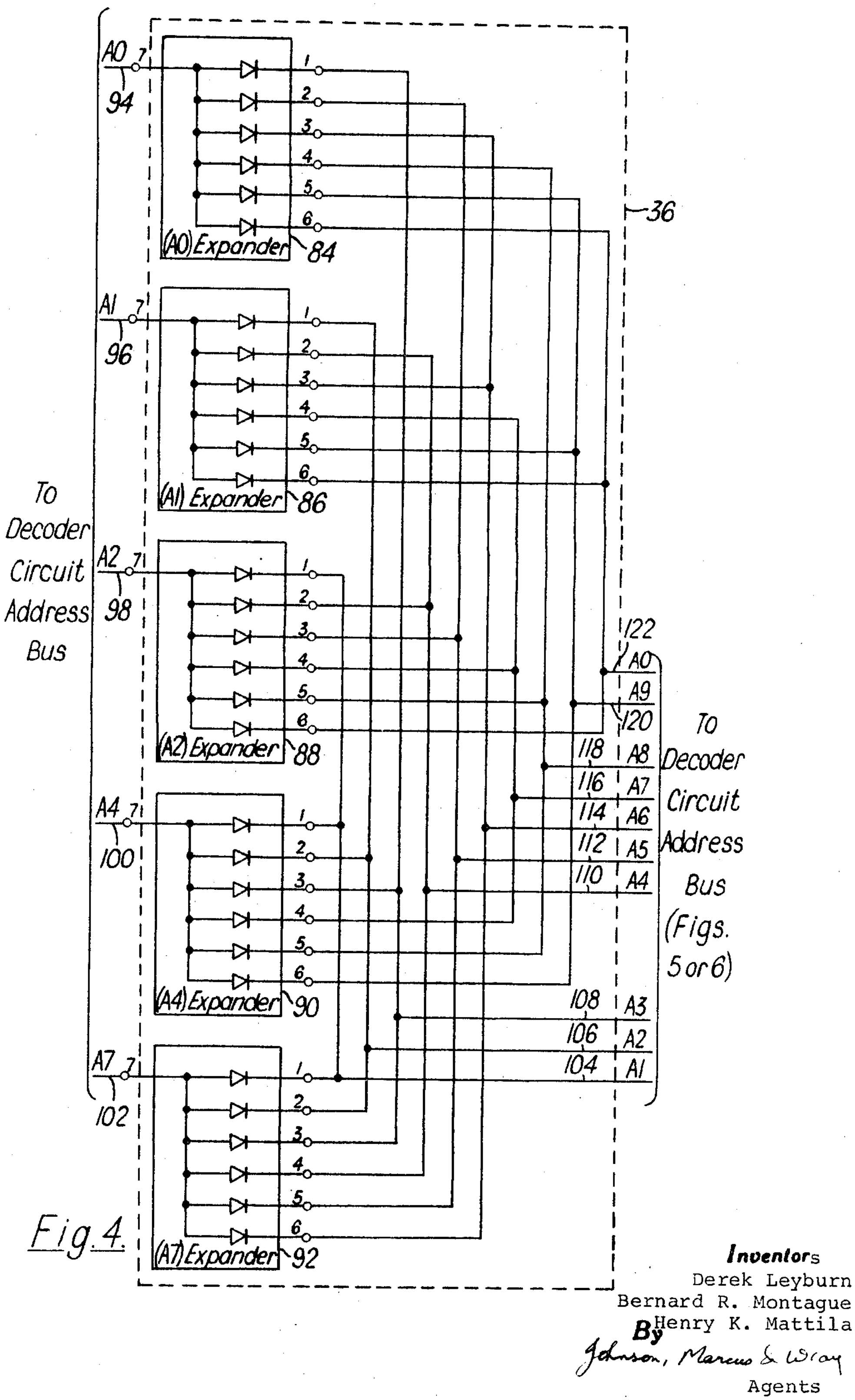
FIG. 4 is a diagrammatic representation of the A digit portion of the ABC digit two-out-of-five to decimal converter unit 36 of FIG. 2.

The detailed construction of the translator system will now be considered. Referring to FIG. 4, there is diagrammatically illustrated the A digit portion of the ABC digit two-out-of-five to decimal converter unit 36 of FIG. 2. The B and C digit portions are substantially identical to the illustrated A digit portion and thus are omitted for clarity purposes. It will be seen that for each of the A digits an expander is provided including a plurality of semi-conductor diodes therein. The expander stages are identified as 84, 86, 88, 90 and 92 respectively for the digits A0, A1, A2, A4, and A7. The corresponding input connection lines are identified as 94, 96, 98, 100, and 102 from the decoder circuit address bus, identified generally as 38 in FIG. 2 but really comprising a plurality of connection lines from the respective ABC digits of the called party's number. By means of the unit 36 of FIG. 2, illustrated in part in FIG. 4, the ABC digits are converted from the input two-out-of-five code into a decimal code by way of the respective diodes. The conversion for the A digit using the circuit illustrated in FIG. 4 will now be considered in relation to a two-out-of-five code input on the connections 94, 96, 98, 100, and 102, the conversion being provided in decimal form on the output connections 104, 106, 108, 110, 112, 114, 116, 118, 120, 122 being respectively the A1, A2 . . . A9, A0 decimal digit lines.

Referring to FIG. 2 and FIG. 4, it should be emphasized that the decoder unit 14 may be a decoder unit which is already provided in an existing telephone system and each decoder stage therein will include a series of five relays, the relays in each respective decoder stage being selected by the preceding circuits in a two-out-of-five code. In FIG. 2 all the relays are identified, for convenience, by the single reference numeral 34 within the decoder unit 14, it being appreciated that there are five relays for the A digit, five relays for the B digit, and five relays for the C digit, etc. whereby the required two-out-of-five code can be used. A request by a caller for routing information, including alternate routing and come-again information corresponding to a particular code representing a called party causes the called party's code to come through to the decoder and initiate operation of the respective relays within the decoder unit 14, i.e. provide a 'request-for'-routing-information signal at the output of the decoder stage. If we assume that the 0 and 2 relays of a particular A digit decoder stage (FIG. 2) are selected by a particular code coming through from a calling party, then the respective relays A0 and A2 are operated so as to close the associated respective contacts 34 (FIG. 2). Thus, when the clock pulse generator 4 applies a clock pulse, at the respective clock pulse time, to each of the five decoder relay lines of that particular decoder stage, then all those relay lines will receive a positive pulse. Only the A0 and A2 lines include closed contacts and therefore a pulse is only passed through those relay contacts on those lines to the connections 32 (FIG. 2). The contacts corresponding to the digits A1, A4 and A7, are open and thus the corresponding lines of 32 do not receive the positive output pulse at the respective clock pulse time. Thus a two-out-of-five information code is provided along the lines 32 and is effective on the unit 36. In this manner the units 36, 40 and 44 are caused to operate in the manner described above. The way in which the unit 36 operates, having received the A0 and A2 voltage pulses, can be better understood if FIG. 4 is considered wherein the A digit portion of the unit 36 is diagrammatically illustrated. The connection line 38 of FIG. 2 is represented as the five lines 94, 96, 98, 100, and 102 corresponding to the respective digits A0, A1, A2, A4 and A7. In this particular case, the A0 and the A2 connection lines 94 and 98 have a positive potential applied thereto at the respective clock pulse time whilst there is no potential on the digit lines 96, 100 and 102 corresponding to the digits A1, A4 and A7. If one follows through the rectifier lines within the expander stages 84, 86, 88, 90 and 92 of FIG. 4, it will be found that the application of a positive potential to lines 94 and 98 is effective to cause that positive potential to be applied to all the decimal output lines, except for the decimal output lines 106 corresponding to the decimal digit A2, because that decimal digit line 106 is not connected in any way to the input two-out-of-five lines 94 and 98 and the other two-out-of-five input lines do not have a potential thereon. In this way a decimal output is obtained corresponding to the input two-out-of-five code. Actually this output is "no voltage" output since all the other decimal output lines have a positive potential thereon — this positive potential is actually ground potential in the circuit illustrated and having regard to the system operation, as stated, the output information is obtained in digital form, i.e. one-out-of-10 decimal selection.

Figure 5:
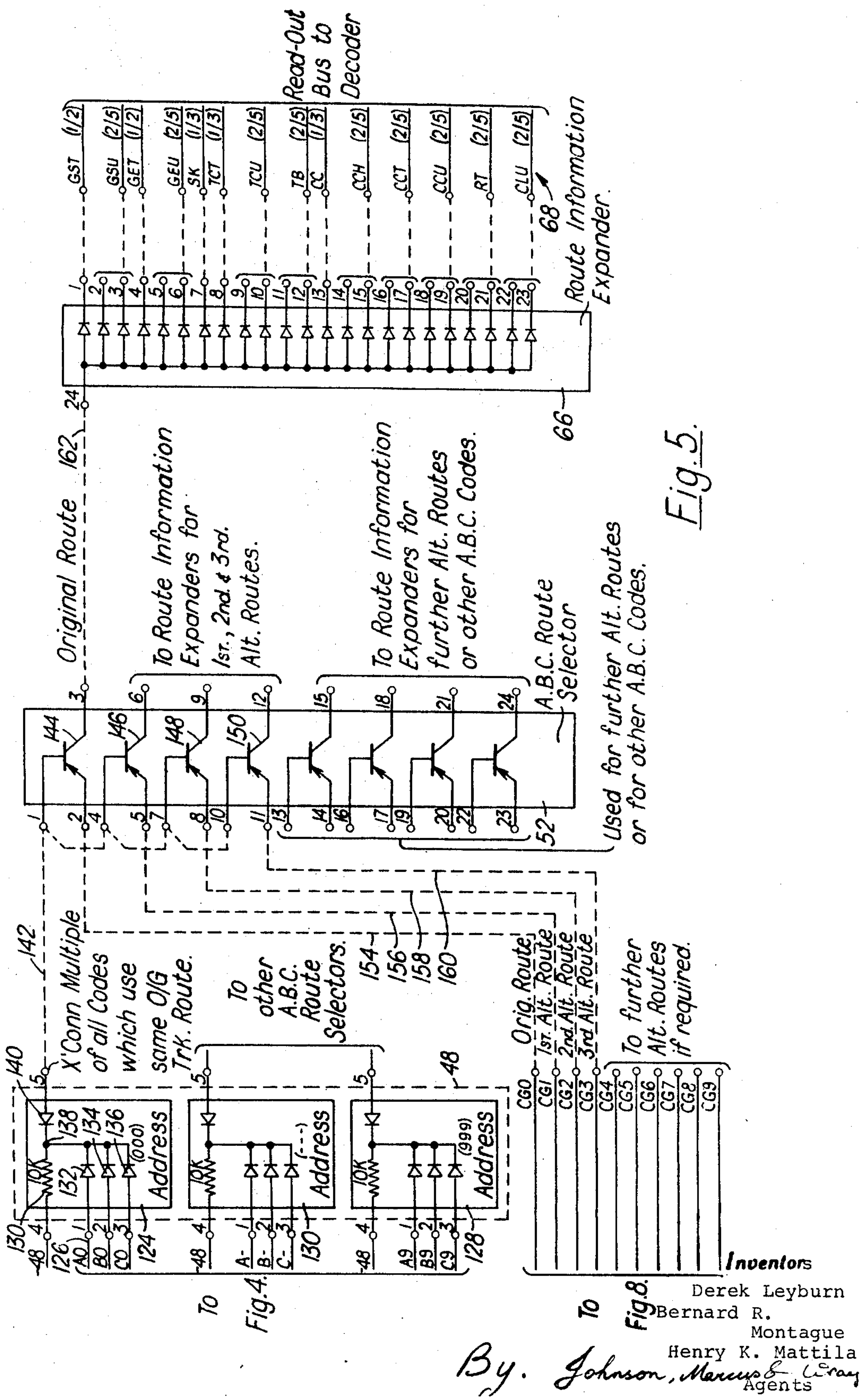
FIG. 5 is a representation of a further part of the system of FIG. 2 showing the address circuit stage, the route selector stage and the route information expander stage in greater detail.

In FIG. 5 there is illustrated a part of the ABC digit two-out-of-five to decimal converter unit 48, the ABC address circuit unit 52, and the route information expander unit 66, in greater detail than in FIG. 2 to facilitate the explanation of the operation thereof. The circuit of FIG. 5 is for three digit translation where no translation is required for the DEF digits. Thus the trunk route for the ABC routes is selected together with the alternate routes. The ABC address circuit unit 48, in FIG. 5, comprises a plurality of address stages, each allocated to ABC digits of a particular numerical value in the decimal system referred to above. For example, the address stage 124 receives the A0, B0, and C0 digit voltages. The A0 line 126 is therefore connected to the A0 output lines 122 of FIG. 5 and similarly the B0 and C0 lines of FIG. 5 are connected to the corresponding B0 and C0 outputs of the B and C stages, similar to FIG. 4, within the decimal converter unit 36. Similarly, the last address stage 128 has input lines A9, B9 and C9 connected to the outputs of the ABC address circuit stages of unit 36, the A9 line being connected to the A9 output line 120 of FIG. 4. An intermediate representative address stage 130 is indicated in FIG. 5, it being appreciated that this represents the required plurality of address stages for decimal operation.

In order to explain the operation of the circuit illustrated in FIG. 5, consideration will be given to the operation of address stage 124 as being a typical stage of the address circuit unit 48.

There are actually one thousand address stages such as 124 in FIG. 5. It will be seen that each address stage includes a NAND gate circuit including a 10 K ohm resistor, such as 130 connected on one side to a —48 volt potential whilst there are also included within each address stage three or four diodes such as 132, 134 and 136. The diodes are connected in series with the respective input line of the address stage and are connected to a common point 138 together with the resistor 130 as shown in FIG. 5. An output, if any, is obtained from the junction 138 by way of a diode 140 along a connection 142. Each of the one thousand address stages is also provided with a corresponding output line 142 and each line is connected to a respective ABC route selector unit, such as 52 in FIG. 5. The route selector units, such as 52, are constructed by integrated or microcircuit techniques and include a plurality of transistors therein.

In the ABC digit address circuit 48, 1,000 NAND gates are provided and the operation is, briefly, that when this particular unit is addressed all NAND gates except one will have ground potential present on one or more of the A-, B-, or C- leads. This ground potential will short circuit the illustrated 10K resistor to prevent a negative potential from being applied to the code point (identified as 138 in the Figures). The required NAND gate will have no ground potential on the A-, B- or C- lead and negative potential will appear at its respective code point 138. The code point is cross-connected to the base of the transistors in the respective ABC route selector unit according to the first and alternate routes required.

As mentioned above, the output from the expander unit of FIG. 4 comprises a ground potential, i.e. positive, on all of the decimal lines A1 through A0 except for that decimal output line A2, i.e. line 106 in FIG. 4. There will also be a B- and C- digit line, at the input to one of the one thousand address stages, such as 124, which will be unconnected and will not have a positive, i.e. ground potential thereon. Thus, one of the address stages will have three input lines such as 126 for A-, B-, and C-, which will all be unconnected. However, all other address stages will include at least one input line which is connected to ground potential. Thus all except one of the address stages will include a diode, such as 132, which will conduct in a forward direction so as to provide a shunt to ground of the junction 138 and shunt the –48 volts through the respective resistor 130 to ground. In that particular one of the address stages, such as 124, corresponding to the A2 etc. digits, then there would be no shunt to ground of the –48 volts through the resistor 130 and thus the junction 138 would be at –48 volts and this –48 volts would be applied along a connection, such as 142, to the base electrode of the respective transistor, such as 144. Actually the connection 142 is connected, as shown by broken lines, to a plurality of transistors, such as 146, 148 and 150. Thus the –48 volts would attempt to turn on all these transistors to which it is applied — it will be appreciated that the number of such transistors will be determined by the circuit requirements. The particular one of the transistors 144, 146, 148 or 150 which is turned on is determined by the potential on the respective emitter electrode. The emitter electrodes of the said transistors are all connected to a separate one of connections 154, 156, 158 and 160. It is only when a potential is applied to the respective said connection that the corresponding transistor is turned on. As shown in FIG. 5, a voltage on connection 154 is indicative that the route requested is the original route and thus transistor 144 is turned on. Connections 146, 148 and 160 are respectively identified with the first, second and third alternate routes.

From the above it will be seen that each of the transistors 144, 146, 148 and 150 is identifiable with a particular trunk route but only one of them gives an output along the connection, such as 162, at any one clock pulse period of time. When an output voltage is fed along the respective connection 162 to the corresponding route information expander 66, then this information expander gives an output which is indicative of the particular route and includes all the routing information required for the input three digit code. Referring to FIG. 5, it will be seen that the illustrated route information expander 66 includes 23 diodes but it must be appreciated that there are, in fact, 100 or 120 diodes and these are allocated in different combinations by groups of 23 to a different respective trunk route. For example, in FIG. 5 the illustrated 23 diodes within the expander unit 26 are allocated to the original trunk route. Thus the application of a positive potential output on line 162 causes the route information expander 66 to give a positive output through each of its illustrated 23 diodes to each of the 23 output terminals illustrated in FIG. 5. The different output terminals of expander unit 66 are identified in normal telephone language and constitute the line 68 of FIG. 2 which provides an input to the decoder buffer circuit unit 78. In the usual way, the abbreviations used in FIG. 5 are in accord with standard practice and thus, for example, GST stands for "-group start tens", GSU stands for "group start units", GET stands for "group end tens", GEU stands for "group end units", and TB stands for "trunk block". The transistors 146, 148, 150 . . . are indicated symbolically as connected to their respective route information expanders, similar to 66 of FIG. 5.

It will be clear that the ABC digit route selector unit consists of one transistor for each outgoing trunk route. A respective trunk route is selected by the combination of negative voltages applied to the base electrode of the illustrated transistor of the ABC address circuit unit and positive potential applied to the emitter electrode from the card group address circuit unit and a positive output then appears at the collector electrode of the transistor and is applied, via cross-connections, to the input of the respective selected route information expander stage in the route information expander unit. The route information expander unit is used to expand the positive signal on a respective input to 23 positive signals on the respective 23 output lines. The 23 output lines are cross-connected to 23 out of the 100 or 120 readout bus leads according to the routing information required for this three digit code.

Figure 6:
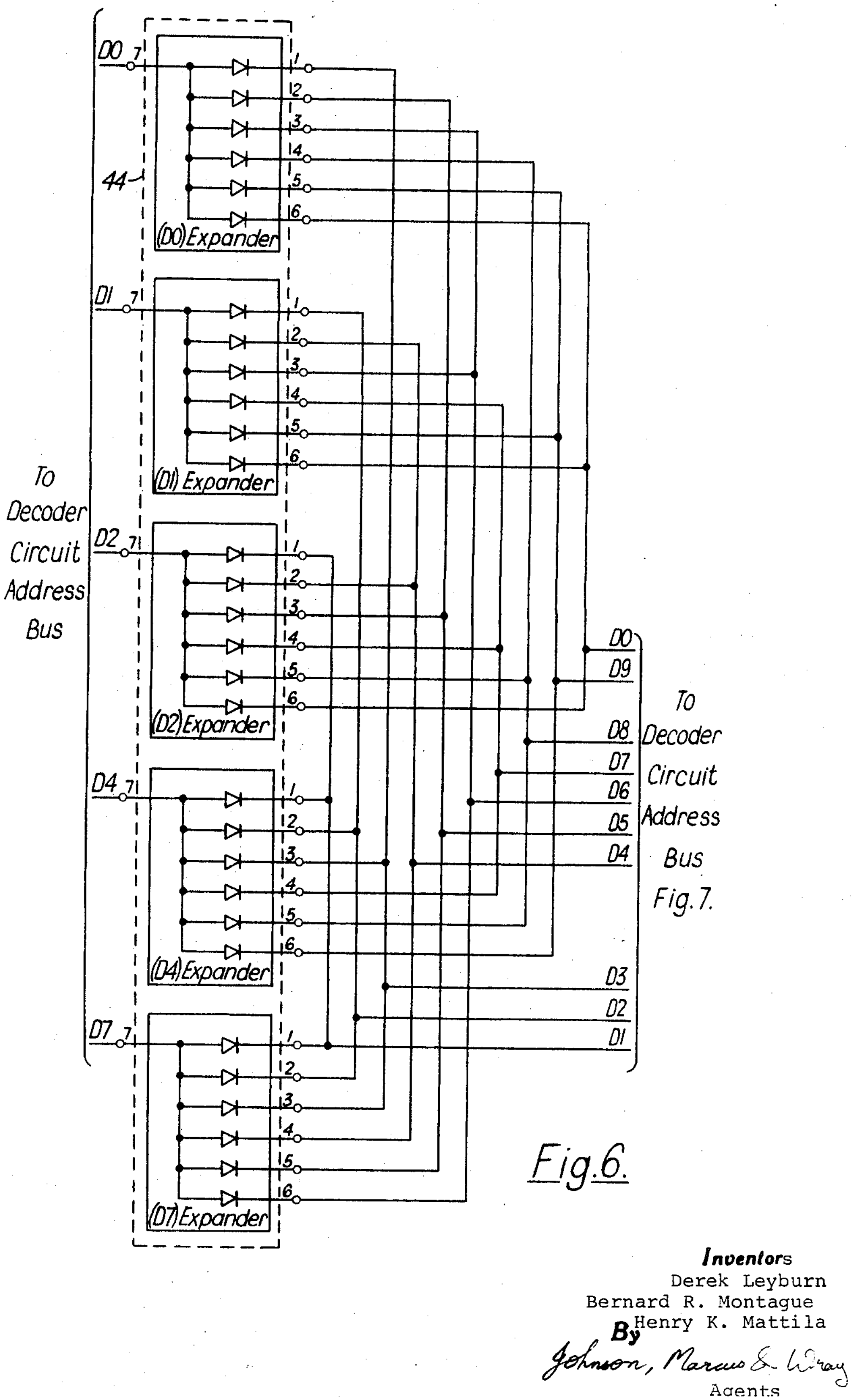
FIG. 6 is a diagrammatic representation similar to FIG. 4 of a part of the expander unit for handling the D digit.

The diagrammatic representations of FIGS. 4 and 5 are in respect of incoming calls which are effectively local calls in which the routing information is only concerned with the three digits ABC. As is well known, when it is required that the system handle six digit information, then additional circuitry must be provided to handle the DEF digits. In FIG. 6 there is diagrammatically illustrated a typical part of the DEF digit two-out-of-five to decimal converter unit 44(FIG. 2) and it will be observed that this is for handling the D digit and is substantially identical to the circuit illustrated in FIG. 4 for handling the A digit. The E and F circuits are also similar whereby one obtains an output in decimal form corresponding to the two-out-of-five code input for the DEF digits.

Figure 7:
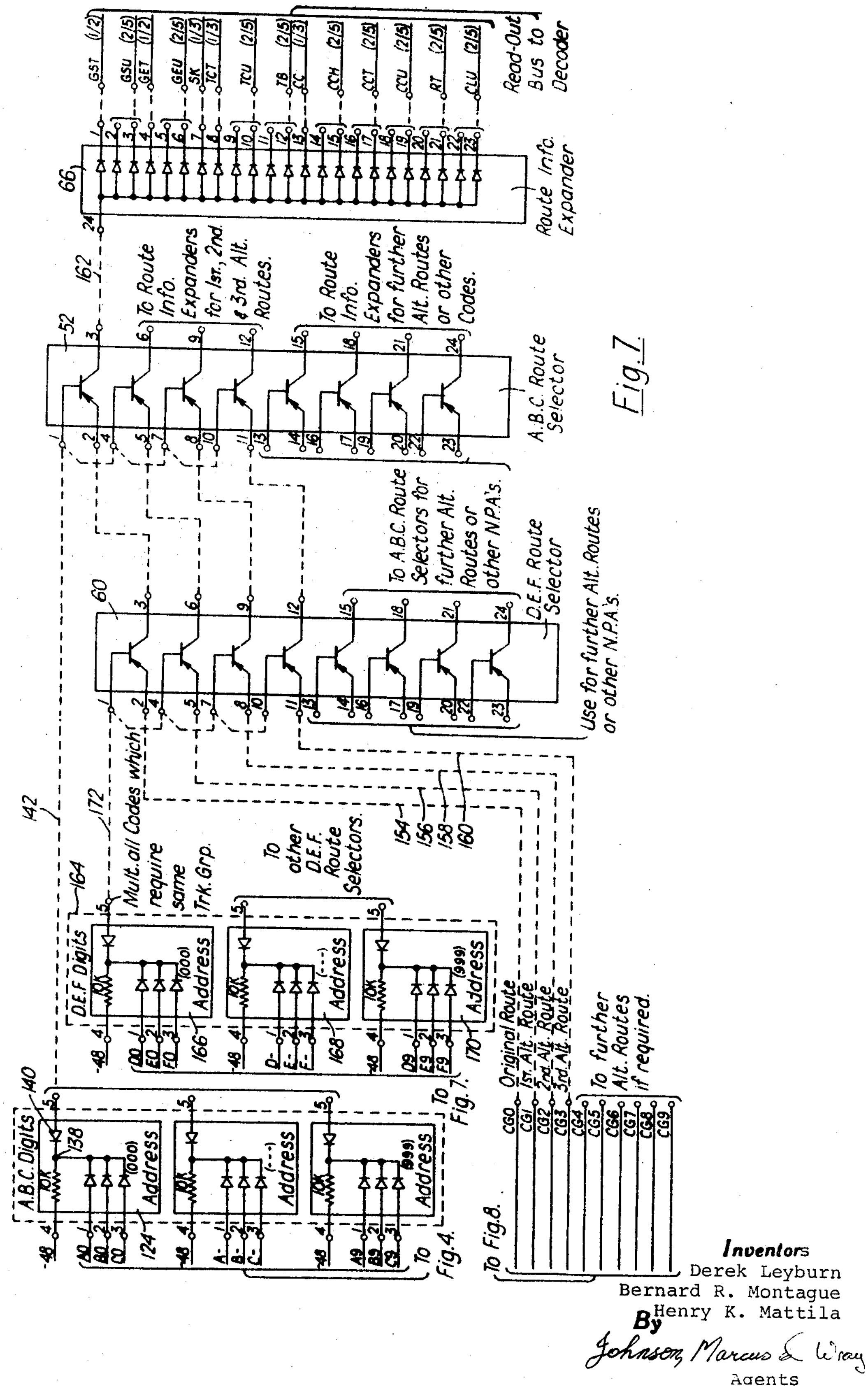
FIG. 7 is a diagrammatic representation similar to FIG. 5 but including facilities for handling information in the six-digit code ABCDEF.

In FIG. 7 there is diagrammatically illustrated a circuit similar to that of FIG. 5 but capable of handling the six digit information of the ABCDEF digits. It will be seen that the circuit of FIG. 7 includes address stages for the DEF digits, similar to the address stages for the ABC digits of FIGS. 5 and 7. For clarity, the same reference numerals are utilized in FIG. 7 as are utilized in FIG. 5 for the same parts, and as shown, the DEF digit route selector unit 60 consists of one transistor per six digit translated route required. The appropriate transistor is caused to conduct by a negative potential on its base electrode applied from the DEF address code point and positive potential on its emitter electrode applied from the card group address unit. The collector electrode output of this transistor provides a positive potential, via a cross-connection, to the appropriate ABC route selector transistor emitter terminal.

Referring to FIG. 7, it will be seen that the ABC digit address unit 48 is shown together with the ABC route selector unit 52, including transistors 144, 146, 148 and 150. However, instead of those transistors being enabled by emitter electrode directly by the card group information on lines 154 through 160, those lines enable a respective transistor of a further series, identified as the DEF route selector unit 60 in FIGS. 7 and 2. It is to be noted that FIG. 7 also includes the DEF address unit 164. The DEF address unit 164, in a similar manner to the ABC address unit 48, includes one thousand address stages such as 166, a typical stage 168, and 170. The operation will be similar to the operation of the address unit 48 and one of the DEF stages will be such that there is no short across the respective illustrated resistor and the –48 volts will be applied through the respective diode along the respective lead 172 so as to be applied to the respective DEF route selector unit 60, corresponding to the particular route concerned, and this –48 volts will then be applied to the base electrode of the illustrated transistors within the DEF route selector unit 60. As explained above for the circuit of FIG. 5, the –48 volts is permitted to be applied along the conductor 172 because all the diodes of the respective address stage, such as 168, do not have a ground potential applied thereto on the DEF input leads.

The transistors of the respective DEF route selector unit 60 are enabled at their base electrodes but, in order to operate, must also be enabled on their respective emitter electrode. This is achieved by applying a ground potential on the respective card group lead 154, 156, 158 or 160 to activate the respective transistor within the selector unit 60, whereby the respective transistor 144, 146, 148 or 150 is enabled at its emitter electrode to cause a positive output on the respective output lead 162 from the ABC route selector unit 52. In this way, the DEF route selector unit 60 is caused to enable a respective transistor in the ABC route selector unit 52 which is representative of the DEF route which is selected. The way in which the card group voltage is obtained for the card group leads 154, 156, 158 or 160 . . . will be explained with reference to FIG. 8, but, referring to FIG. 7, it will be appreciated that the output therefrom is obtained from the route information expander unit 66 by way of a positive, i.e. ground potential, applied to the respective 23 out of a total of 120 leads 68. These selective 23 leads are cross-connected according to the information required for the associated trunk group. There will be one route information expander unit 66 for each trunk group leaving the respective office.

As mentioned above, all the output leads 68 go through the buffer stages 78 (FIGS. 2 and 3) and the required buffer stages are selected by the clock pulse at the respective clock pulse time period $T_0$ through $T_3$.

Figure 8:
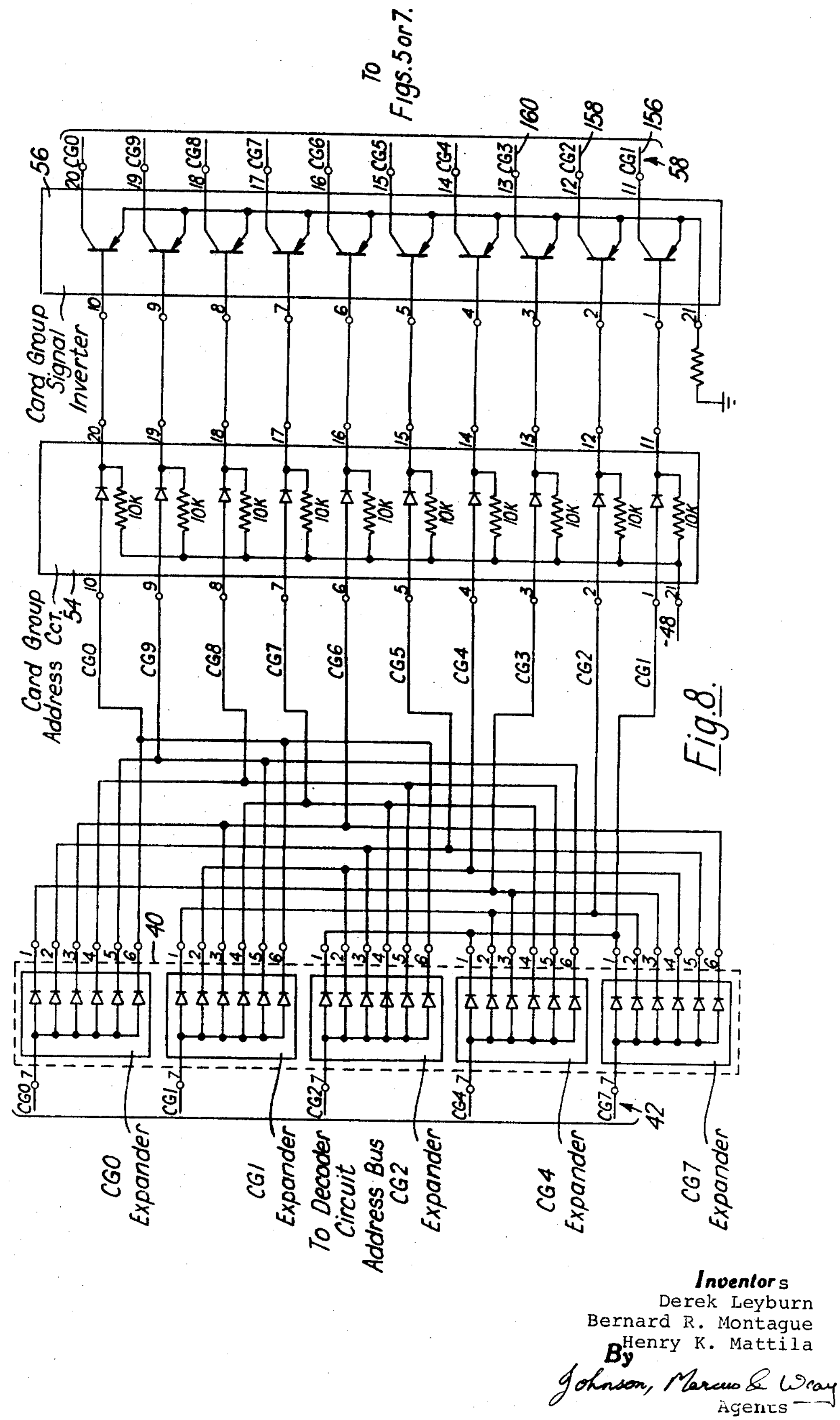
FIG. 8 is a diagrammatic representation of the card group units of FIG. 2, represented in greater detail to permit an understanding of their operation.

In FIG. 8,the card group units of FIG. 2 are diagrammatically represented in greater detail and the operation of these units will now be considered. The information input from the decoders along line 42 (FIGS. 2 and 8) is in the form of 2-out-of-5 code information appearing on the five input lines, identified in FIG. 8 as CG0, CG1, CG2, CG4 and CG7 in the usual way, and the output from the card group two-out-of-five to decimal converter unit 40 appears as a selection of one-out-of-10 output leads, i.e. decimal output, being a positive potential, i.e. ground, appearing on all those leads except that one which is representative of the decimal information. Thus, in the card group address circuit 54 the illustrated −48 volts is shunted to ground by all the illustrated diodes except that one which is connected to the information output line of the converter unit 40, which information output line is not connected to ground potential. Thus, since that particular diode does not conduct, the −48 volts is not shunted and −48 volts appears on one respective output line from the card group address circuit unit 54. Each output line from the unit 54 is connected to the base electrode of a respective individual transistor within the card group signal inverter unit 56, as shown in FIG. 8. Thus, when the −48 volts is applied to an output line of the unit 54, then that −48 volts is applied to the base electrode of a single transistor within the inverter unit 56. Thus, that transistor is caused to conduct and a ground potential is applied from the emitter electrode of the respective transistor to the particular card group output which it is desired to enable, i.e. one of the outputs identified as CG0 to CG9. This ground potential on the card group output is applied along the respective card group lead, such as 154, in FIGS. 5, 7 and 8 and is thus applied to the emitter of the respective transistor stage within the ABC route selector unit 52 (FIG. 5) or the DEF route selector unit 60 (FIG. 7). Thus, the respective transistor is ON and an enabling voltage is applied along the output line to the next unit of the circuit — i.e. via cross-connections to the emitter terminals of the required route selector transistors.

It will be appreciated that the card group address circuit 54 and the card group signal inverter unit 56 of FIG. 8 may be constructed by integrated circuit techniques of medium scale, i.e. having about twenty pins.

It will also be appreciated that only the main components of the respective units, for example, the card group signal inverter stage of FIG. 8, are illustrated and that there will normally be other components included, for example, to provide the required bias potentials, etc.

In the manner described above, the output information is applied to the respective buffer stage and the route information is applied to the respective decoder stage together with information as to the alternate route if this is required.

In practice, when a decoder stage passes through the first translation it comes through as the original route CG0 and this may be, for example, to go to New York direct. When the decoder gets the information for the route and its is discovered that all the trunks therefor are busy, then the decoder has already received information on one of the 23 of the 120 output lines 68, for example line CCH, that to come back for the alternate route it must come back on the card group 1, i.e. CG1. This may be via Toronto and the route may thus be completed via Toronto. However, if again it is discovered that all the trunk routes via Toronto are busy then the decoder stage again comes back for a third translation on card group 2, i.e. CG2, which may well be via Montreal. This can continue all the way through the 40 or so alternate routes which are available for connection to New York. The alternate system is to provide a "look ahead" feature whereby the decoder is instructed as to the next step to take and the decoder stage follows the instructions which are given on the 23 out of 120 leads referred to above. A decoder may be instructed by the output leads to start the group, for example, on a particular tens and a particular units identification, i.e. group start tens such and such a number and group starts such and such a number, i.e. CST and CSU lines in FIG. 5. The decoder will also be instructed to end the search for an alternate route on a particular alternate route numbered in tens and units and this information will appear on the group end tens line, GET, and the group end units GEU, in FIGS. 5 and 7. Thus, the respective decoder stage knows the place at which it must start a search for an alternate route and also the place at which it must stop and this may well be within any one of the plurality of frames provided in the telephone office, the frame being identified as TCU for units and TCT for tens in the lines 68 of FIGS. 5 and 7. If the decoder stage searches through all the provided routes, e.g. 40, and finds that all are busy then it already has instructions on a respective one of the lines RT- whereby it can try another route to determine if that is available. It is to be noted that the decoder stage does not come back to the translator unit and therefore this operation is referred to as "route advancing," as opposed to the case when the decoder stage does come back in "alternate routing" operation. When the decoder stage has proceeded to investigate the forth possible routes and discovers that they are all busy, if it is on "route advance" then the decoder stage itself is cross-connected so as to automatically search the next frame 01 and to search the forty possible routes therein which may be identified as TB7. If all the routes within this frame are busy, then the cross-connections of the decoder stage indicate that the next frame 02 should be searched and so on until 120 trunk routes have been searched. As will be appreciated, there may be forth trunk routes in each frame whereby three frames may be provided.

In the described embodiment of this invention, a clock pulse generator unit is provided to obtain timing pulses whereby a single translator is selectively connected, in response to the pulses, to a respective one of a plurality of decoder stages. The advantage of this is, of course, that only one translator unit may be provided for handling a plurality of decoder units whereby there is a considerable saving in components. It is also to be noted that since integrated circuits are used throughout there may well be an economical advantage.

In some previous translator systems, the principle of operation using relays has been to utilize "space division" whereby the selected decoder was given exclusive rights through the translator system. In the described embodiment of the present invention, using integrated circuit techniques, the principle of "time division" is used whereby a decoder stage is informed that it can have so much time, determined by a clock pulse period, at a particular space in time which is determined by the position in time of the respective clock pulse allocated to the decoder stage. This is practical because of the increased speed achieved by using the described translator system since it appears that only five microseconds will be required for each translation in the described translator unit, the main time being taken up in the decoder stage. It appears that the decoder stage requires approximately 150 milliseconds as opposed to the 5 microseconds required for the translator unit. If the decoder stage had been used with a known type of card translator it would have required an additional 300 milliseconds, and if it had been used with the above-mentioned relay-type translator unit then it would still require an additional 30 milliseconds as opposed to the 5 microseconds, in the described embodiment, multiplied by the number of decoder stages which are provided. For example, if twenty decoder stages are provided then the translator unit still only requires 100 microseconds and this is an obvious advantage so far as time of operation of the telephone system is concerned. It is to be noted that the predominant time is determined by the decoder unit. In a typical large telephone office with a card-type translator one might well require 24 decoders and with the relay-type diode translator referred to above one might still require 12 decoder stages whereas with the described integrated circuit translator unit one could well maintain the same efficiency of operation, etc., with only 8 to 10 decoder units.

From an economic point of view, it would appear that there would be a substantial saving in cost as a fully duplicated system could be provided, using the described translator unit, for a much lower cost than with the previously used card translator units or the above-mentioned relay-diode system.

Referring to FIG. 7, the address stages within the units 48 and 164 may well be standard NAND gates using −6 volts instead of the illustrated −48 volts. In constructing the integrated circuits to operate from the −6 volts, the system would be compatible with some known systems. However, it will be appreciated that the design of systems using the −48 volts would not present any difficulty and may well be required in some cases.

It will be appreciated from the above description that the described embodiment uses wired logic or plug-in matrix logic and integrated circuits only and a 5 microsecond clock pulse is provided 6 divide the translation time evenly and sequentially between the decoder stages. The wired logic may, in practice, be replaced by program boards or Digiswitches for ease of programming if required while a particular semi-conductor device which could be utilized in apparatus according to the present invention is the field controlled switch of H. L. D. Eng which is the subject of U.S. application Ser. No. 844,748, filed 25 July, 1969, and now abandoned, and was the subject of a paper presented at the International Conference on Advanced Microelectrics at Paris, France April 6, — 10, 1970, If desired, the complete translator unit could be constructed from integrated circuits including the transistors, diodes, etc.

Although a clock pulse generator has been referred to above as being utilized to cause the connection of the translator unit in turn to the output of each decoder stage, it will be appreciated that other suitable means, for example an electronic switch, may be utilized and the invention is not restricted to the specific circuits described and illustrated.

We claim:

1. Telephone translator apparatus comprising:

a. a plurality of decoder stages;

b. a translator unit for translating input codes each made up of a number of code digits into translations each made up of a number of information bits representing routing information, and selectively connectable to the output of each of said decoder stages;

c. means for connecting the outputs of said decoder stages in turn to the input of said translator unit, said means including a clock pulse generator for providing a repeating series of clock pulses, each clock pulse being associated with the respective one of said decoder stages whereby the outputs of said decoder stages are connected in turn to the input of said translator unit in response to the respective clock pulse;

d. means for feeding said routing information to said decoder stages, each of said decoder stages being responsive to the said routing information to initiate completion of a route connection between a calling and a called party when a route therebetween is available; and wherein e. said feeding means comprises a plurality of buffer stages, each stage being associated with a respective different one of said decoder stages, the inputs of each of said buffer stages being connected in parallel to the output of said translator unit and the output of each buffer stage being connected to an input of a respective decoder stage;

f. the buffer stage associated with each decoder stage being activated by the clock pulse generator for the duration of the respective clock pulse time period corresponding to that particular decoder stage; and g. whereby when said particular decoder stage requests routing information to a calling party, it is connected to the translator unit during its respective clock pulse, said translator unit determines the required routing information, and said routing information is fed to the particular decoder stage through the associated buffer stage during the same respective clock pulse time period.

2. Apparatus according to claim 1 wherein:

a. said translator unit includes a first, second and third parallel path between its input and an ABC digit route selector unit;

b. said first path including an ABC digit two-out-of-five to decimal converter unit and an ABC address circuit unit, the output of the ABC address circuit unit being connected to a first input of said ABC digit route selector unit; and c. a route information expander unit connected to the output of said ABC digit route selector unit to provide the requested route information to the buffer stages and thus to the respective decoder stage during said same respective clock pulse time period.

3. Apparatus according to claim 2 wherein:

a. said ABC address circuit unit comprises a plurality of ABC diode-resistor networks, each adapted to provide an output only in response to a separate distinctive ABC input code information signal;

b. the output of each said ABC diode-resistor network being connected to the base electrodes of a plurality of ABC transistors in a respective one of a plurality of ABC route selector units, at least equal in number to the number of said ABC diode-resistor networks;

c. a respective one of a plurality of route information expander units being connected to the output electrode of each of said transistors to provide a corresponding code information output corresponding to the requested route information; and d. each ABC transistor includes a control electrode capable of turning on the respective ABC transistor in response to an enabling voltage applied thereto along a respective one of a plurality of control connections.

4. Apparatus according to claim 3 wherein each control connection corresponds to a different alternate route, whereby an enabling voltage applied therealong turns on the respective ABC transistor to cause the respective route information expander to provide said code information output corresponding to the respective alternate route.

5. Apparatus according to claim 3 including:

a. a DEF address circuit unit in the second path and comprising a plurality of DEF diode-resistor networks, each adapted to provide an output only in response to a separate distinctive DEF input code information signal;

b. the output of each said DEF network being connected to the base electrodes of a plurality of DEF transistors in a respective one of a plurality of DEF route selector units, at least equal in number to the number of said diode-resistor networks;

c. each DEF transistor having an output electrode connected to a different respective one of said plurality of control connections to provide the enabling voltage thereto;

d. each DEF transistor including a control electrode capable of turning on the respective DEF transistor in response to a second enabling voltage applied thereto along a respective one of a plurality of alternate route control connections;

e. each alternate route control connection corresponding to a different alternate route, whereby a second enabling voltage applied therealong turns on the respective DEF transistor to thus turn on the respective ABC transistor to cause the respective route information expander to provide said code information output corresponding to the respective alternate route.

6. Apparatus according to claim 1 wherein:

a. the output of each decoder stage is connected to a first input of a respective one of a plurality of AND gates;

b. the output of each AND gate is connected to the input of said translator unit; and c. the clock pulse generator has a plurality of output lines, corresponding in number to the number of clock pulses, each output line being connected to a second input of a respective different AND gate whereby successive clock pulses are applied to successive respective AND gates and if a request-for-routing-information signal is present on the output of the respective decoder stage, then the respective AND gate is activated at the respective clock pulse time period and the output of the respective decoder stage is connected to the input of said translator unit for the duration of the respective clock pulse time period.

7. Apparatus according to claim 6 wherein:

a. said translator unit includes a first, second and third parallel path between its input and an ABC digit route selector unit;

b. said first path including an ABC digit two-out-of-five to decimal converter unit and an ABC address circuit unit, the output of the ABC address circuit unit being connected to a main first input of said ABC digit route selector unit; and c. a route information expander unit connected to the output of said ABC digit route selector unit to provide the requested route information to the buffer stages and thus to the respective decoder stage during said same respective clock pulse time period.

8. Apparatus according to claim 7 wherein:

a. said ABC address circuit unit comprises a plurality of ABC diode-resistor networks, each adapted to provide an output only in response to a separate distinctive ABC input code information signal;

b. the output of each said ABC diode-resistor network being connected to the base electrodes of a plurality of ABC transistors in a respective one of a plurality of ABC route selector units, at least equal in number to the number of said ABC diode-resistor networks;

c. a respective one of a plurality of route information expander units being connected to the output electrode of each of said transistors to provide a corresponding code information output corresponding to the requested route information; and d. each ABC transistor includes a control electrode capable of turning on the respective ABC transistor in response to an enabling voltage applied thereto along a respective one of a plurality of control connections.

9. Apparatus according to claim 8 wherein each control connection corresponds to a different alternate route, whereby an enabling voltage applied therealong turns on the respective ABC transistor to cause the respective route information expander to provide said code information output corresponding to the respective alternate route.

10. Apparatus according to claim 8 including:

a. a DEF address circuit unit in a second path and comprising a plurality of DEF diode-resistor networks, each adapted to provide an output only in response to a separate distinctive DEF input code information signal;

b. the output of each said DEF network being connected to the base electrodes of a plurality of DEF transistors in a respective one of a plurality of DEF route selector units, at least equal in number to the number of said diode-resistor networks;

c. each DEF transistor having an output electrode connected to a different respective one of said plurality of control connections to provide the enabling voltage thereto;

d. each DEF transistor including a control electrode capable of turning on the respective DEF transistor in response to a second enabling voltage applied thereto along a respective one of a plurality of alternate route control connections;

e. each alternate route control connection corresponding to a different alternate route, whereby a second enabling voltage applied therealong turns on the respective DEF transistor to thus turn on the respective ABC transistor to cause the respective route information expander to provide said code information output corresponding to the respective alternate route.

* * * * *